Sept. 2, 1958 — A. TURAK — 2,850,040
GANG DISPENSING VALVE WITH BYPASS
Filed June 23, 1953 — 2 Sheets-Sheet 1

INVENTOR.
ANTHONY TURAK.
BY Woodling and Krost
attys

Sept. 2, 1958 A. TURAK 2,850,040
GANG DISPENSING VALVE WITH BYPASS
Filed June 23, 1953 2 Sheets-Sheet 2

INVENTOR.
ANTHONY TURAK
BY Woodling and Krost
attys

United States Patent Office 2,850,040
Patented Sept. 2, 1958

2,850,040

GANG DISPENSING VALVE WITH BYPASS

Anthony Turak, Cleveland, Ohio

Application June 23, 1953, Serial No. 363,619

3 Claims. (Cl. 137—599)

This invention relates generally to valve structures, and relates specifically to a dispensing and mixing valve for syrup concentrates with carbonated water and the dispensing of plain carbonated water.

An object of this invention is to provide a dispensing and mixing valve for two or more different kinds of soft drinks, or plain carbonated water.

Another object of this invention is to provide a gang faucet construction which may be dismantled, cleaned, or repaired, and rebuilt with a minimum of time and effort.

Still another object of this invention is to provide a gang faucet for mixing concentrates and soda water, with a by-pass valve to tap off plain soda water.

And yet another object of this invention is to provide a gang valve construction which needs a minor degree of precision construction and can be adjusted to compensate for wear.

Other objects and a fuller understanding of the invention may be had by referring to the following description and claims, taken in conjunction with the accompanying drawings, in which:

Figures 1, 2, 3, 3A, 3B:
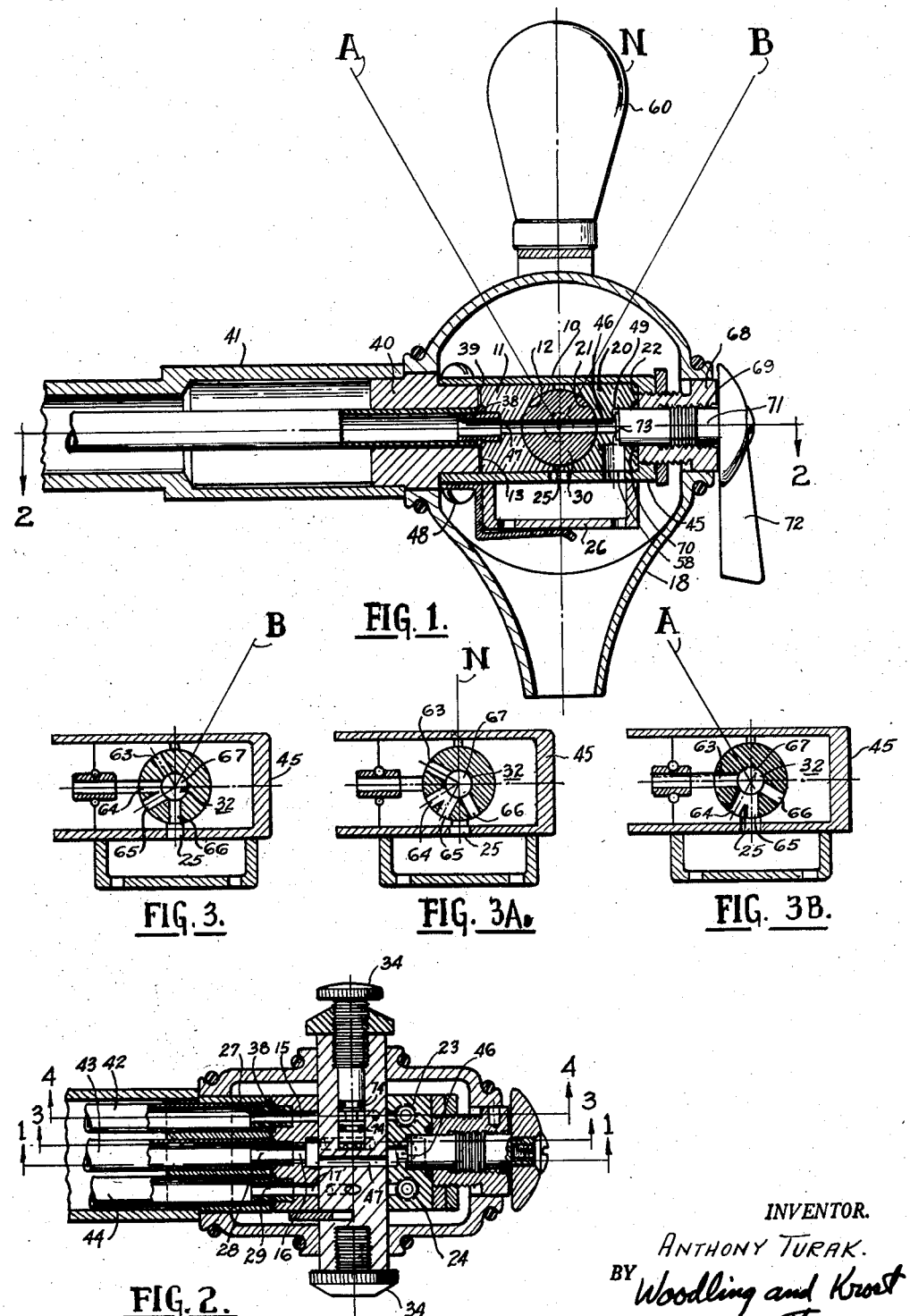
Figure 1 is a side view in section of an improved gang valve embodying the features of this invention taken along line 1—1 of Figure 2.
Figure 2 is a section taken along line 2—2 of Figure 1.
Figure 3 is a substantially diagrammatic cross sectional illustration as taken from the line 3—3 of Figure 2 of the cooperating valve members in a relative position produced by moving the ocntrol handle to the position labeled "B"
Figure 3A is a view similar to Figure 3 with the valve parts in the relative position produced by moving the control handle to the position labeled "N"
Figure 3B is a view similar to Figure 3 with the valve parts in the relative position produced by moving the control handle to the position labeled "A"

This application is a continuation in part of application Serial No. 313,626, filed October 8, 1952, now Patent No. 2,767,737, for Gang Dispensing Valve.

Although the actual construction of a gang faucet embodying the principles of this invention may vary according to individual requirements, the construction illustrated in the drawings is the preferred embodiment for general use. The drawings illustrate a gang faucet of conventional appearance enclosed within a suitable housing 18. The invention relates, however, to the mechanical structure within the housing.

The mixing and dispensing mechanism is indicated by the reference character 10. Referring principally to Figure 1 of the drawings, the gang faucet comprises a first valve body 11. One face of the first valve body 11 is substantially entirely defined by a semi-cylindrical groove surface 12. The flat surface opposite the groove surface 12 is indicated by the reference character 13.

A second valve body 20 appears substantially identical to valve body 11 and is provided with a groove surface 21. The flat surface of valve body 20 opposite the groove surface 21 is indicated by the reference character 22. Valve bodies 11 and 20 are positioned with the groove surfaces thereof facing and defining a cylindrical guideway. The valve bodies do not quite touch one another in defining the true cylindrical guideway in order that there will be no possibility of the valve bodies touching to transmit pressure from one valve body directly to the other.

A cylindrical valve member 30 is mounted between the valve bodies 11 and 20 and rotatably driven by handle 60 and is thereby rotatable within the guideway defined by the groove surfaces 12 and 21. It has been discovered that the first and second valve bodies 11 and 20 may preferably be made of cast nylon in order to eliminate the necessity of using a packing to prevent leakage of fluids between the mating surfaces of the grooves 12 and 21 and the cylindrical member 30. By compressing the first and second valve bodies together upon the cylindrical member, an operative dispensing valve structure is accomplished without the need of auxiliary packing and guiding mechanisms.

In adapting the basic portion of this invention to practical use, a bracket 41 is provided to extend from a wall or cabinet or other suitable base to which the dispensing faucet may be physically secured. Bracket 41 may be a length of pipe with a suitable base flange thereon. A member 40, which may be referred to as a base member, is fitted into the end of the bracket 41. The base 40 presents a forward seating surface 39 toward which the surface 13 of valve body 11 may be urged. A plurality of fluid conduits 42, 43, and 44 lead from the exterior of the base member and through the base member 40. The conduits preferably extend through the pipe bracket 41 in order to remain hidden from view.

In the first valve body 11, fluid passageways 15, 16, and 17 extend from the exterior of the valve body 11 to the groove surface 12. In the illustrated embodiment these passageways open in the surface 13 and are spaced to register with the fluid conduits 42, 43 and 44 passing through the base member 40. Short locating conduit sections 27, 28, and 29 engage into fluid conduits 42, 43 and 44 and project beyond the seating surface 39.

An O ring gasket 38 around each locating conduit section 27, 28, and 29 is positioned between surfaces 13 and 39 in order to remove the necessity of precision fit.

Figure 4:
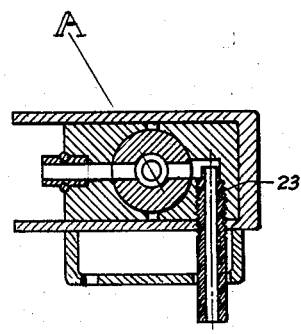
Figure 4 is a substantially diagrammatic cross sectional illustration as taken from the line 4—4 of Figure 2 of the cooperating valve members in a relative position produced by moving the control handle to the position labeled "A"
Figure 5:
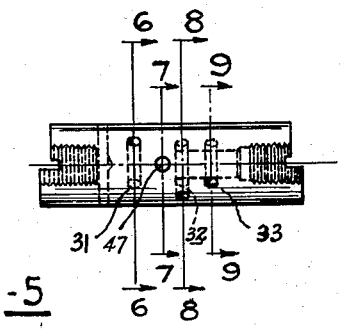
Figure 5 is a front view of the fluid distributing valve member.
Figure 6:
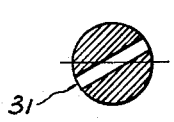
Figures 6, 7, 8 and 9 are sections taken as indicated from Figure 5.

The second valve body 20 is provided with fluid passageways 23 and 24 extending from the groove surface 21 to the exterior of the valve body 20. As illustrated best in Figure 4 of the drawings, the passageway 23 turns at right angles with respect to the longitudinal axis of the cylindrical valve member 30 and thereby directs fluid passing through this passageway in a downwardly direction. The passageway 24 is similar in most respects to the passageway 23 illustrated in Figure 4. The passageways 23 and 24 are provided as outlets for fluid entering the valve mechanism through fluid conduits 42 and 44. A third passageway, or exhaust port, 25 is formed at the junction area of the valve bodies 11 and 20 as illustrated in Figure 3 of the drawings. Exhaust port 25 is substantially an enlarged recess area in the faces of the valve bodies 11 and 20.

The valve member 30 is set forth best in Figures 5 through 9. There are a plurality of fluid passageways 31, 32, and 33 through the valve member 30, and a by-pass passageway 47. The fluid passageways 31 and 33 each have an entrance opening angularly spaced along the surface of the valve member 30 with respect to one another in a predetermined pattern. The fluid passageway 32, has a plurality of such entrance openings, and is adapted to conduct fluid from the passageway 16 whenever there is fluid passing through either of the passageways 31 or 33. As illustrated in Figures 3, 3A, and 3B, passageway 32 comprises a plurality of laterally extending passageway sections 63 and 64 leading to a central axial chamber 67, and passageway sections 65 and 66 leading from the axial chamber 67. In Figure 3, it is evident that whenever the handle 60 of the valve is in position "B" of Figure 1, the passageway sections 64 and 66 will provide a fluid path from the passageway 16 into the central axial chamber 67 and out through exhaust port 25. Figure 3A represents the neutral position "N" of the handle 60 wherein none of the passageway sections are aligned between the conduit 16 and exhaust port 25. Figure 3B represents the "A" position of the handle wherein passageway sections 63 and 65 are aligned to dispense fluid from conduit 16 through the exhaust port 25. The passageway sections 63 to 66 are also arranged in a predetermined pattern and, accordingly, the passageways 31, 32, and 33 may be said to have entrance openings angularly spaced along the surface of valve member 30 with respect to one another in a predetermined pattern for registering a selected number of the fluid passageways in the valve bodies 11 and 20 and conducting fluid under pressure through the valve. Movement of the valve member 30 into the various selected positions "A," "B," or neutral (N), will alternately feed from passageways 31 and 33 together with the passageway 32, or shut off all feed, as desired.

The improved valve construction of this invention is desirable because of the fact that it can be easily assembled and disassembled for cleaning and repairing and also because it may be easily adjusted to compensate for wear by the valve 30 and the valve bodies 11 and 20. A yoke 45 is provided to embrace both bodies 11 and 20 and the valve member 30, and to hold them together under a predetermined pressure to prevent leakage. The yoke 45 is anchored to the base member 40 by bolts or screws 48.

Figure 7:
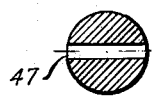
Figures 8, 9:
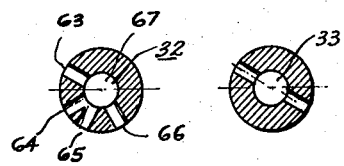

The opening of fluid passageway 16 into the groove surface 12 is considerably enlarged as compared with the passageways 15 and 17. A by-pass passageway 47 extends through the plug valve 30 as best shown in Figures 1 and 7 of the drawings. The fluid passageway 32 and by-pass passageway 47 are closely adjacent and both feed from the fluid passageway 16. However, there is only one position of registration of by-pass passageway 47 with the fluid passageway 16 and that position is in the neutral position of the handle 60. When the handle 60 is in the neutral position, by-pass passageway 47 is the only passageway in registration with a supply source.

The valve body 20 is provided with a by-pass outlet passageway 46 opening into a chamber 49 in the valve body 20. A vertically extending conduit 58 connects to the bottom of chamber 49 and provides an outlet for flow of fluid from passageway 16 through passageway 47 to the exterior of the valve.

A threaded plug body 68 is threadably engaged into the end of the yoke 45 as illustrated in Figure 1. The plug body 68 is tightened into the yoke 45 to serve as a compression member to press the valve bodies 11 and 20, with valve plug 30 therebetween, together and against surface 39. Plug body 68 has a threaded central longitudinal chamber 69 therethrough. A circular gasket 70 seals between the plug 68 and the valve body 20 to prevent flow of fluid between these mating surfaces. A valve rod 71 having a manual operating handle 72 thereon is threadably engaged into the chamber 69 and extends into the chamber 49. A sealing gasket 73 on the end of valve rod 71 is abuttable against the end of the by-pass outlet passageway 46 and thereby provides a shut-off valve structure to prevent flow of fluid through the valve body 30 when the handle 60 is in neutral position, except when the handle 72 is deliberately rotated to remove the obstruction from passageway 46 and allow the flow to proceed.

By the particular construction thus far described as an example of the invention, the mixing valve provides a construction wherein the main operating handle 60 has two active positions and a neutral or shut-off position. In one active position, a syrup concentrate from one supply line is mixed with carbonated water from a common supply line, and in another position, syrup concentrate from a second supply line is dispensed with carbonated water from the common supply line. In addition, a second control valve will open a by-pass line from the common supply line to allow only carbonated water to flow from the valve.

The valve member 30 is rotated between selected positions by means of a suitable handle 60 which spans the housing 18 and engages the ends of the valve member 30 as illustrated in Figure 2 of the drawings. Thumb screws 34 hold the handle 60 engaged into the valve member 30.

Previous valve constructions have been designed to dispense two mixed beverages and one unmixed beverage from three supply lines, but such valve construction normally lacks the positive dispensing position which is provided by this invention. According to this invention as illustrated in the embodiment of the drawings, the by-pass passageway and the exhaust port 25 both empty into a diffusing basket 26. However, for use in soda fountains, not only a diffused soda, but a high pressure soda stream is sometimes needed. In the event that a high pressure stream is needed for the plain soda water, the conduit 58 may extend through the diffusion basket 26 to a suitable nozzle opening directly out of the bottom of the housing 18.

As disclosed and claimed in co-pending application Serial No. 332,458, filed January 21, 1953, the rate of flow of the carbonated water through passageway 32 is controlled by an extension of one thumb screw 34 extending into the chamber 67. In the illustrated embodiment in this case as distinguished from the application Serial No. 332,458, the carbonated water line is between the two syrup concentrate lines and, consequently, the passageway 31 must be bridged by the thumb screw 34. A slight recess in the surface of screw 34 as indicated in Figure 2 permits the flow of fluid past the screw 34 and suitable O rings 74 seal the bridge and confine the flow to the passageway 31.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A valve, comprising, a valve body, a valve plug mounted in said body, first, second and third fluid conduits leading from the exterior of said body to said valve plug, a plurality of passageways in said valve plug for said fluid conduits, said conduits and passageway entrance ends being angularly spaced with respect to one another in a predetermined pattern for registering a selected number of passageway entrance ends with said first and second conduits and with said second and third conduits in two different positions of said valve plug, outlet means for each said passageway, said valve plug having a neutral position wherein no said conduit, passageway, and outlet means are in registration to thereby shut off all flow therethrough, a by-pass passageway in said valve body and said valve plug registering with said second conduit in the neutral position of said valve plug, and by-pass shut-off valve means separate from said valve plug for control of fluid flow from said by-pass passageway to said outlet means.

2. A beverage mixing and dispensing valve, comprising, a valve body, said body having a valve socket chamber, a plurality of fluid conduits leading from the exterior of said body into said valve socket chamber, a valve plug rotatably mounted fluid-tight in said valve socket chamber, drive means for rotating said valve plug in said chamber, a passageway system laterally through said valve plug for each fluid conduit, said passageway systems having entrance ends angularly spaced with respect to one another along the surface of said valve plug in a predetermined pattern for registering first and second different groups of entrance ends and conduits in first and second different valve plug positions, said valve plug having a neutral position wherein none of said passageway entrance ends and conduits are in registration to thereby shut off all flow therethrough, first outlet means for each said passageway system, a by-pass passageway system through said valve plug from a given fluid conduit, second outlet means for said by-pass passageway system and joining with said first outlet means, said by-pass passageway system registering with said given conduit in the neutral position of said valve plug, and by-pass shut-off valve means in said second outlet means and separate from said valve plug for control of fluid flow from said second outlet means.

3. A dispensing valve comprising a first valve body having a concave surface defining a first portion of a valve socket, a second valve body having a concave surface defining a second portion of a valve socket, means holding said first and second valve bodies with the concave surfaces thereof relatively positioned to define portions of a valve plug guideway, first, second, and third fluid conduits leading from the exterior of the first valve body to the concave surface thereof, a first valve plug rotatably mounted in said valve plug guideway with the concave surfaces fitting fluid-tight therewith and selectively sealing off said fluid conduits, a plurality of passageways laterally through said valve plug, said passageways having entrance openings angularly spaced with respect to one another along the surface of said valve plug in a predetermined pattern for registering a first pair of said passageway openings with said first and second conduits in a first position of said valve plug and for registering another pair of passageway openings with said second and third conduits in a second position of said valve plug, said valve plug having a neutral position wherein all said passageways and said conduits are out of registration to thereby shut off all flow through said passageways, first outlet means for said dispensing valve for each said passageway, a by-pass passageway separate from the aforementioned passageways laterally extending through said valve plug from said second conduit, said by-pass passageway registering with said second conduit in the neutral position of said valve plug, a by-pass shut-off valve plug separate from said first valve plug and mounted in said dispensing valve and having an inlet registering with said by-pass passageway at least with said first valve plug in said neutral position, and second outlet means for said by-pass shut-off valve and joining with said first outlet means in said dispensing valve.

References Cited in the file of this patent

UNITED STATES PATENTS

| | | |
|---|---|---|
| 164,448 | Hallett | June 15, 1875 |
| 667,301 | Dredge | Feb. 5, 1901 |
| 1,177,034 | Holt | Mar. 28, 1916 |
| 1,282,650 | Studdard | Oct. 22, 1918 |
| 2,165,096 | Frechette | July 4, 1939 |
| 2,182,724 | Hennessy | Dec. 5, 1939 |
| 2,557,289 | Housekeeper | June 19, 1951 |